United States Patent
Kroll et al.

(10) Patent No.: US 9,527,157 B2
(45) Date of Patent: Dec. 27, 2016

(54) FEED-THROUGH

(71) Applicant: Schott AG, Mainz (DE)

(72) Inventors: Frank Kroll, Landshut (DE); Helmut Hartl, Vienna (AT); Andreas Roters, Mainz (DE); Hauke Esemann, Woerrstadt (DE); Dieter Goedeke, Bad Soden (DE); Ulf Dahlmann, Gau-Odernheim (DE); Sabine Pichler-Wilhelm, Landshut (DE); Martin Landendinger, Rottenburg (DE); Linda Johanna Backnaes, Landshut (DE)

(73) Assignee: Schott AG, Mainz (DE)

( * ) Notice: Subject to any disclaimer, the term of this patent is extended or adjusted under 35 U.S.C. 154(b) by 635 days.

(21) Appl. No.: 13/965,874

(22) Filed: Aug. 13, 2013

(65) Prior Publication Data
US 2013/0330603 A1   Dec. 12, 2013

Related U.S. Application Data (63) Continuation of application No. PCT/EP2012/000700, filed on Feb. 17, 2012.

(30) Foreign Application Priority Data

Feb. 18, 2011  (DE) .................. 10 2011 011 705
Feb. 25, 2011  (DE) .................. 10 2011 012 430
(Continued)

(51) Int. Cl.
  *H01M 2/02*    (2006.01)
  *B23K 15/00*   (2006.01)
(Continued)

(52) U.S. Cl.
  CPC .......... *B23K 15/0093* (2013.01); *B23K 26/32* (2013.01); *C03C 3/19* (2013.01); *C03C 4/20* (2013.01);
(Continued)

(58) Field of Classification Search
  CPC ..... B23K 15/0093; B23K 26/32; C03C 27/02; C03C 29/00; C03C 3/19; C03C 4/20; C03C 8/00; C03C 8/24; H01M 10/0525; H01M 2/06; H01M 2/065; H01M 2/24; H01M 2/305; Y02E 60/122; Y10T 29/49108; Y10T 29/4911; Y10T 29/49115
  See application file for complete search history.

(56) References Cited

U.S. PATENT DOCUMENTS 961,672 A    6/1910  Barnhurst
3,005,865 A  10/1961  Jonsson
(Continued)

FOREIGN PATENT DOCUMENTS

CN  87 1 06453 A   4/1988
DE  27 33 948 A1   8/1978
(Continued)

OTHER PUBLICATIONS

"Handbook of Batteries", published by David Linden, 2nd issue, McGrawhill, 1995, Chapters 36 & 39 (88 pages).
(Continued)

*Primary Examiner* — Patrick Ryan
*Assistant Examiner* — Ben Lewis
(74) *Attorney, Agent, or Firm* — Taylor IP, P.C.

(57) ABSTRACT

A feed-through has a base body, for example in the form of a disk-shaped metal part. The base body includes at least one opening through which at least one conductor, for example an essentially pin-shaped conductor, embedded in a glass or
(Continued)

glass ceramic material, is guided. The base body includes a material having a low melting point, such as a light metal, and the glass or glass ceramic material is selected in such a manner that the melting temperature thereof is lower than the melting temperature of the material of the base body.

54 Claims, 6 Drawing Sheets (30) Foreign Application Priority Data

| Apr. 1, 2011 | (DE) | 10 2011 015 869 |
| Jun. 10, 2011 | (DE) | 10 2011 103 975 |
| Jun. 10, 2011 | (DE) | 10 2011 103 976 |
| Jul. 7, 2011 | (DE) | 10 2011 106 873 |

(51) Int. Cl.

| C03C 3/19 | (2006.01) |
| C03C 4/20 | (2006.01) |
| C03C 8/24 | (2006.01) |
| C03C 29/00 | (2006.01) |
| H01M 2/06 | (2006.01) |
| H01M 2/30 | (2006.01) |
| H01M 10/0525 | (2010.01) |
| C03C 8/00 | (2006.01) |
| C03C 27/02 | (2006.01) |
| H01M 2/24 | (2006.01) |
| B23K 26/32 | (2014.01) |

(52) U.S. Cl.
CPC . *C03C 8/00* (2013.01); *C03C 8/24* (2013.01); *C03C 27/02* (2013.01); *C03C 29/00* (2013.01); *H01M 2/06* (2013.01); *H01M 2/065* (2013.01); *H01M 2/24* (2013.01); *H01M 2/305* (2013.01); *H01M 10/0525* (2013.01); *Y02E 60/122* (2013.01); *Y10T 29/4911* (2015.01); *Y10T 29/49108* (2015.01); *Y10T 29/49115* (2015.01)

(56) References Cited

U.S. PATENT DOCUMENTS

| 4,212,930 A | 7/1980 | Athearn |
| 4,308,323 A | 12/1981 | Bowsky |
| 5,015,530 A | 5/1991 | Brow et al. |
| 5,262,364 A | 11/1993 | Brow et al. |
| 5,476,749 A | 12/1995 | Steinmann et al. |
| 5,773,959 A | 6/1998 | Merritt et al. |
| 5,849,434 A | 12/1998 | Miura et al. |
| 5,851,222 A * | 12/1998 | Taylor .................. A61N 1/3752 607/36 |
| 5,853,914 A | 12/1998 | Kawakami |
| 5,874,185 A | 2/1999 | Wang et al. |
| 5,900,183 A | 5/1999 | Kronfli et al. |
| 5,952,126 A | 9/1999 | Lee et al. |
| 6,159,630 A | 12/2000 | Wyser |
| 6,165,632 A | 12/2000 | Blum et al. |
| 6,335,117 B1 | 1/2002 | Yoshida et al. |
| 6,475,669 B2 | 11/2002 | Probst et al. |
| 6,919,121 B2 | 7/2005 | Stowell et al. |
| 7,294,430 B2 | 11/2007 | Wyser |
| 7,335,443 B2 | 2/2008 | Magneron |
| 7,687,200 B2 | 3/2010 | Jouanneau-Si-Larbi et al. |
| 2003/0134194 A1* | 7/2003 | Lasater ................ C03C 8/24 429/181 |
| 2006/0133980 A1* | 6/2006 | Nanba .................. H01M 4/133 423/445 R |
| 2007/0138403 A1 | 6/2007 | Cubric et al. |
| 2008/0224102 A1* | 9/2008 | Lee ......................... H01B 1/22 252/514 |

FOREIGN PATENT DOCUMENTS

| DE | 690 23 071 T2 | 6/1996 |
| DE | 101 05 877 A1 | 8/2001 |
| DE | 698 04 378 T2 | 10/2002 |
| DE | 699 23 805 T2 | 7/2005 |
| DE | 10 2009 011 182 A1 | 9/2010 |
| DE | 10 2011 012 430 A1 | 8/2012 |
| EP | 0 035 074 A2 | 9/1981 |
| EP | 0 412 655 A2 | 7/1990 |
| EP | 0 885 874 A1 | 5/1998 |
| EP | 0 954 045 A2 | 4/1999 |
| FR | 2 585 185 | 1/1987 |
| JP | H-10-208709 A | 8/1998 |
| JP | 11-126586 A | 5/1999 |
| JP | 11-135084 A | 5/1999 |
| JP | 11-176399 A | 7/1999 |
| SU | 1 058 909 A1 | 12/1983 |
| WO | 80/01620 A1 | 8/1980 |
| WO | 2012/110244 A1 | 8/2012 |

OTHER PUBLICATIONS

R. Gorke, K.J. Leers: Keram.Z.48 (1996), "Automatisierung eines Erhitzungsmikroskops mit Hilfe digitaler Bildverarbeitung", pp. 300-305 (6 pages).
International Search Report dated Jun. 22, 2012 for International Application No. PCT/EP2012/000700 (6 pages).
DIN 51730, Testing of solid fuels—Determination of fusibility of fuel ash, Sep. 2007 (16 pages).
ISO 540, Hard coal and coke—Determination of ash fusibility, International Standard, Fourth edition, Jun. 1, 2008 (20 pages).
DIN CEN/TS 15404, Solid recovered fuels—Methods for the determination of ash melting behaviour by using characteristic temperatures, Nov. 2010 (19 pages).
DIN CEN/TS 15370-1, Solid biofuels—Method for the determination of ash melting behaviour—Part 1: Characteristic ternmperatures method, Dec. 2006 (12 pages).
Notification Concerning Transmittal of International Preliminary Report on Patentability and Written Decision of the International Searching Authority dated Aug. 29, 2013 for International Application No. PCT/EP2012/000700 (7 pages).
"Schott Guide to Glass", second edition, 1996, Chapman & Hall, Chapter 2 (11 pages).
Search Report dated Mar. 4, 2015 for Chinese Application No. 201280004537.4 (2 pages).

* cited by examiner

FEED-THROUGH

CROSS REFERENCE TO RELATED APPLICATIONS

This is a continuation of PCT application No. PCT/EP2012/000700, entitled "FEED-THROUGH", filed Feb. 17, 2012, which is incorporated herein by reference.

BACKGROUND OF THE INVENTION

1. Field of the Invention

The present invention relates to a feed-through having a base body, for example in the form of a disk-like metal part, and one conductor, such as a pin-shaped conductor, embedded in a glass or glass ceramic material which is guided through an opening in the base body.

2. Description of the Related Art

Lithium-ion batteries have been known for many years. In this regard we refer you to the "Handbook of Batteries, published by David Linden, 2nd issue, McGrawhill, 1995, chapters 36 and 39".

Various aspects of lithium-ion accumulators are described in a multitude of patents, for example, U.S. Pat. No. 961,672; U.S. Pat. No. 5,952,126; U.S. Pat. No. 5,900,183; U.S. Pat. No. 5,874,185; U.S. Pat. No. 5,849,434; U.S. Pat. No. 5,853,914; and U.S. Pat. No. 5,773,959.

In particular in the use of batteries, preferably lithium-ion batteries in the automobile industry, a multitude of problems such as corrosion resistance, stability in accidents and vibration resistance must be solved. An additional problem is the hermetic seal of the battery, in particular the lithium-ion battery, over an extended period of time. The hermetic seal may for example be compromised by leakage in the area of the electrodes of the battery or respectively the electrode feed-through of the battery, by a battery short-circuit or temperature changes leading to a reduced life span of the battery.

In order to ensure better stability in accidents, a housing for a lithium-ion battery is suggested, for example in DE 101 05 877 A1, whereby the housing includes a metal jacket which is open on both sides and which is being sealed. The power connection is insulated by a synthetic material. A disadvantage of the synthetic material insulation is the limited temperature resistance and the uncertain hermetic seal over the service life.

An alkaline battery has become known from DE 27 33 948 A1 wherein an insulator, for example glass or ceramic, is joined directly by means of a fusion bond with a metal component.

One of the metal parts is connected electrically with one anode of the alkaline battery and the other is connected electrically with the cathode of the alkaline battery. The metals used in DE 27 33, 948 A1 are iron or steel. Light metals like aluminum are not described in DE 27 33 948 A1. Also, the sealing temperature of the glass or ceramic material is not cited in DE 27 33 948 A1. The alkaline battery described in DE 27 33 948 A1 is a battery with an alkaline electrolyte which, according to DE 27 33 948 A1 contains sodium hydroxide or potassium hydroxide. Lithium-ion batteries are not mentioned in DE 27 33 948 A1.

A method to produce asymmetrical organic carboxylic acid esters and to produce anhydrous organic electrolytes for alkali-ion batteries has become known from DE 698 04 378 T2, or respectively EP 0885 874 B1. Electrolytes for rechargeable lithium-ion cells are also described in DE 698 04 378 T2, or respectively EP 0885 874 B1.

An RF (radio frequency) feed-through with improved electrical efficiency is described in DE 699 23 805 T2, or respectively EP 0 954 045 B1. The feed-throughs known from DE 699 23 805 T2, or respectively EP 0 954 045 B1, are not glass-metal feed-throughs. Glass-metal feed-throughs which are provided immediately inside the metal wall of a packing are described in EP 0 954 045 B1 as being disadvantageous since RF feed-throughs of this type, due to embrittlement of the glass, are not durable.

DE 690 230 71 T2, or respectively EP 0 412 655 B1, describes a glass-metal feed-through for batteries or other electrochemical cells, whereby glasses having a $SiO_2$ content of approximately 45 weight-% are being used and metals, in particular alloys, are being used which contain molybdenum and/or chromium and/or nickel. The use of light metals is also insufficiently addressed in DE 690 230 71 T2, as are sealing temperatures or respectively bonding temperatures for the used glasses. The materials used for the pin shaped conductor are, according to DE 690 230 71 T2 or respectively EP 0 412 655 B1, alloys which contain molybdenum, niobium or tantalum.

A glass-metal feed-through for lithium-ion batteries has become known from U.S. Pat. No. 7,687,200. According to U.S. Pat. No. 7,687,200 the housing was produced from high-grade steel and the pin-shaped conductor from platinum/iridium. The glass materials cited in U.S. Pat. No. 7,687,200 are glasses TA23 and CABAL-12. According to U.S. Pat. No. 5,015,530 these are $CaO$—$MgO$—$Al_2O_3$—$B_2O_3$ systems having sealing temperatures of 1025° C. or 800° C. Moreover, glass compositions for glass-metal feed-throughs for lithium batteries have become known from U.S. Pat. No. 5,015,530 which contain $CaO$, $Al_2O_3$, $B_2O_3$, $SrO$ and $BaO$ whose sealing temperatures are in the range of between 650° C.-750° C. and which are therefore too high for use with light metals. Furthermore, barium is undesirable in many applications since it is considered to be environmentally harmful and hazardous to health. Also discussed is strontium, the use of which is also to be avoided in the future.

The glass compositions according to U.S. Pat. No. 7,687,200 moreover have a coefficient of expansion $\alpha$ in the temperature range of 20° C. to 300° C. of only $\alpha \approx 9 \times 10^{-6}$/K (Kelvin).

What is needed in the art is a feed-through which avoids the problems of the current state of the art.

SUMMARY OF THE INVENTION

The present invention provides a feed-through which includes a base body, for example in the form of a disk-like metal part, whereby the base body includes at least one opening through which a conductor, for example an essentially pin-shaped conductor, embedded in a glass or glass ceramic material, is guided. The disk-like metal part may have any desired shape; in particular it may be round, that is circular, oval or angular.

When placing conductors, in particular in the form of metal pins into a base body, for example into a disk-like metal part which consists of light metals, for example aluminum, hermetically tight feed-throughs have been hitherto not possible. Aluminum, however, is discussed as a material particularly for accumulators, such as for lithium-ion batteries. Lithium-ion batteries are intended for various applications, for example for portable electronic equipment, cell phones, power tools and in electric vehicles. The batteries can replace traditional energy sources, for example lead-acid batteries, nickel-cadmium batteries or nickel-metal hydride batteries.

A battery according to the present invention is to be understood to be a disposable battery which is disposed of and/or recycled after its discharge, as well as an accumulator.

In order to avoid that during the sealing process the metal, in particular the light metal of the base body and possibly also of the metal pin, melts or deforms, it is provided that the glass or glass ceramic material has a sealing temperature with a metal, in particular a material of the base body, having a low melting point which is below the melting temperature of the of the metal having a low melting point.

Glass or glass ceramic materials which serve to provide a bonded joint as in the above-described example, or respectively a compression seal, are also referred to as solder glass. With the inventive feed-throughs the sealing temperature is in the range of between approximately 400° C. to 650° C.

In compression seal feed-throughs the glass or glass ceramic material adheres frictionally engaged or connected to the surrounding metal. The frictional connection is lost as soon as the counterforce generated by the static friction is exceeded.

Sealing temperature of the glass or glass ceramic is to be understood to be the temperature of the glass or the glass ceramic whereby the glass material softens and then fits closely against the metal which is to be sealed so that a bonded joint connection is obtained between the glass or the glass ceramic and the metal.

The sealing temperature may, for example, be determined through the hemispherical temperature as described in R. Görke, K. J. Leers: Keram. Z. 48 (1996) 300-305, or according to DIN 51730, ISO 540 or CEN/TS 15404 and 15370-1, whose disclosure content is incorporated in its entirety in the current patent application. According to DE 10 2009 011 182A1, the hemispherical temperature can be determined in a microscopic process by using a heating stage microscope. It identifies the temperature at which an originally cylindrical test body melted into a hemispherical mass. A viscosity of approximately log $\eta$=4.6 deciPascals (dPas) can be allocated to the hemispherical temperature, as can be learned from appropriate technical literature. If a crystallization-free glass, for example in the form of a glass powder, is melted down and then cooled so that it solidifies, it can then normally be melted down again at the same melting temperature. For a bonded connection with a crystallization-free glass this means that the operating temperature to which the bonded connection is continuously subjected may not be higher than the sealing temperature. Glass compositions as utilized in the current application are generally often produced from a glass powder which is melted down and which, under the influence of heat, provides the bonded connection with the components which are to be joined. Generally, the sealing temperature or melting temperature is consistent with the level of the so-called hemispherical temperature of the glass. Glasses having low sealing temperatures or respectively melting temperatures are also referred to as solder glass. Instead of sealing or melting temperature, one speaks of solder temperature or soldering temperature in this instance. The sealing temperature or respectively the solder temperature may deviate from the hemispherical temperature by +20K.

The solder glasses having become known from DE 10 2009 011 182 A1 pertain to high temperature applications, for example fuel cells. Sealing of the conductor, in particular the pin-shaped conductor into the opening occurs as follows:

First, the glass or glass ceramic material is inserted into the opening in the base body, together with the pin shaped conductor. Then, the glass together with the pin shaped conductor, is heated to the sealing temperature of the glass, so that the glass or glass ceramic material softens and surrounds the pin shaped conductor in the opening and fits closely against the base body. Since the melting temperature of the material of the base body as well as of the pin shaped conductor is higher than the sealing temperature of the glass, the base body, as well as the conductor, in particular the pin shaped conductor are in a solid state. The sealing temperature of the glass or glass ceramic material is, for example in a range of approximately 20 to 150 K below the melting temperature of the material of the base body or respectively of the pin shaped conductor. If for example, the light metal used is aluminum having a melting point of $T_{MELT}$=660.32° C., then the sealing temperature of the glass or glass ceramic material which can be determined through the hemispherical temperature is in the range of 350° C. to 640° C., for example in the range of 450° C. to <600° C. As an alternative to a light metal, such as for example aluminum, magnesium, aluminum alloys or magnesium alloys, a SiC matrix which is infiltrated with aluminum (Al) could also be used as material for the base body. A material of this type is also described as AlSiC. AlSiC has a SiC core into which Al is infused. Based on the proportion of Al, the properties, especially the coefficient of expansion can be adjusted. AlSiC notably has a lower heat expansion than pure aluminum.

Additional materials for the base body are titanium and/or titanium alloys, in particular Ti6246 or Ti6242. Titanium is a material which is well tolerated by the body, so that it is used for medical applications, for example in prosthetics. Due to its strength, resistance and low weight its use is also favored in special applications, for example in racing sports, but also for aerospace applications.

Additional materials for the base body are also metals, in particular steel, stainless steel, high-grade steel or tool steel which is intended for a later heat treatment. Suitable for use as high-grade steels are, for example, X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, X6CrNiMoTi17-12-2. In order to be able to provide an especially effective weldability during laser welding, as well as during resistance welding, high-grade steels, in particular Cr—Ni-steels having material grade numbers (WNr.) according to Euro-Norm (EN) 1.4301, 1.4302, 1.4303, 1.4304, 1.4305, 1.4306, 1.4307 are used as materials for the base body and/or the housing component, in particular the battery cell housing. St35, St37 or St38 can be used as standard steel.

In the current application, metals which have a specific weight of less than 5.0 kilograms per cubic decimeter (kg/dm$^3$) are understood to be light metals. The specific weight of the light metals is, for example, in the range of 1.0 kg/dm3 to 3.0 kg/dm$^3$.

If the light metals are additionally used as materials for the conductors, for example for the pin shaped conductor or the electrode connecting component, then the light metals further distinguish themselves through an electric conductivity in the range of $5 \times 10^6$ Siemens per meter (S/m) to $50 \times 10^6$ S/m.

When used in compression seal feed-throughs the coefficient of expansion $\alpha$ of the light metal for a range of 20° C. to 300° C. is moreover in the range of $10 \times 10^{-6}$/K to $30 \times 10^{-6}$/K.

The previously provided definition for a light metal refers in particular to aluminum and aluminum alloys having a melting point or respectively melting temperature in the range of 350° C. to 700° C., an electric conductivity in the range of $10\times10^6$ S/m to $40\times10^6$ S/m, a coefficient of expansion in the range of $18\times10^{-6}$/K to $26\times10^{-6}$/K, as well as a specific weight in the range of 2.5 kg/dm$^3$ to 2.9 kg/dm$^3$ and magnesium and magnesium alloys having a melting point or respectively melting temperature in the range of 350° C. to 800° C., having an electric conductivity in the range of $5\times10^6$ S/m to $50\times10^6$ S/m, a coefficient of expansion in the range of $20\times10^{-6}$ to $30\times10^{-6}$/K, as well as a specific weight in the range of 1.0 kg/dm$^3$ to 3.0 kg/dm$^3$.

The inventive feed-through thereby distinguishes itself in that a seal, in particular a pressure seal into a base body having a low melting point or respectively a base body consisting of a material having a low melting is possible.

The material of the conductor, in particular the pin shaped conductor, can be identical to the material of the base body—for example aluminum, an aluminum alloy, AlSiC, magnesium or a magnesium alloy. This has the advantage that the coefficient of expansion of base body and metal pin is identical. The coefficient of expansion $\alpha$ of the glass- or glass ceramic material needs then only to be adapted to one material. If a compression seal feed-through is to be provided, then $\alpha_{glass}$ is selected different from $\alpha_{base\ body}$ and/or $\alpha_{metal\ pin}$. If $\alpha_{glass}$ is approximately $\alpha_{base\ body}$ or $\alpha_{metal\ pin}$ we have an adapted feed-through. In the case of adapted feed-throughs no tensions between the insulator, in particular the glass material and the base body or the metal pin occur at temperature changes due to the essentially identical coefficients of expansion of the materials. This type of characteristic can be advantageous.

The pin-shaped conductor can alternatively include Copper (Cu), CuSiC or a copper alloy.

Other materials for the conductor, in particular the pin-shaped conductor, can be aluminum alloys, magnesium or magnesium alloys, gold or gold alloys, silver or silver alloys, NiFe, a NiFe jacket with a copper core, as well as a cobalt-iron alloy.

As aluminum or an aluminum alloy for the conductor, the following may be used:
EN AW-1050 A;
EN AW-1350;
EN AW-2014;
EN AW-3003;
EN AW-4032;
EN AW-5019;
EN AW-5056;
EN AW-5083;
EN AW-5556A;
EN AW-6060; and
EN AW-6061.

As copper or a copper alloy, in particular for the conductor, the following may be used:
Cu-PHC 2.0070;
Cu-OF 2.0070;
Cu-ETP 2.0065;
Cu-HCP 2.0070; and
Cu-DHP 2.0090.

In the event that the base body and the metal pin are from different materials, then $\alpha_{base\ body} \geq \alpha_{glass} \geq \alpha_{metal\ pin}$ applies for example. Alternatively to a single glass material with one coefficient of expansion, provision may be made in an embodiment of the present invention that the glass or glass ceramic material includes a first glass or glass ceramic material having a first coefficient of expansion $\alpha_1$ and a second glass or glass ceramic material having a second coefficient of expansion $\alpha_2$, whereby the coefficient of expansion $\alpha_1$ of the first glass or glass ceramic material is adapted to the coefficient of expansion of the material of the base body and the coefficient of expansion $\alpha_2$ is adapted to the coefficient of expansion of the pin-shaped conductor. The glass components consisting of several different glasses can be produced for example as glass forming parts, consisting of several glass materials.

Further, it is feasible that the first metal is a light metal, for example aluminum, and the first glass material is selected so that the coefficient of expansion $\alpha$ is adapted to the coefficient of expansion of aluminum (approximately $\alpha=23\times10^{-6}$/K at 20° C.). The values for the coefficient of expansion $\alpha_1$ are therefore in the range of $(16\ \text{to}\ 25)\times10^{-6}$/K within a temperature range of 20° C. to 300° C.

As glass materials with such a coefficient of expansion $\alpha_1$ silicate-titanate, sulfa-phosphate, telluride, borate, vanadate, fluoride, phosphate and silicate are suitable as glass families.

For the purpose of expansion adaptation, that is for the purpose of adapting to the coefficient of expansion, these glass materials can also be provided with fillers. Also the addition of alkalis or alkaline earths to the glasses, in order to adjust the coefficient of expansion is conceivable.

If, as described previously, in an embodiment of the feed-through according to the present invention the pin-shaped conductor is copper or a copper alloy with a coefficient of expansion of approximately $\alpha=16\times10^{-6}$/K at 20° C., then the second glass material is selected so that the coefficient of expansion $\alpha_2$ is in the range of the coefficient of expansion of the metal pin, that is between 12 and $18\times10^{-6}$/K at 20° C.

Glass or glass ceramic materials which provide a coefficient of expansion of this type are for example the glass families of silicate-titanate, sulfa-phosphate, telluride, borate, vanadate, fluoride, phosphate and silicate. For adaption of expansion, additions may also be provided for these glasses, for example alkalis or alkaline earths.

Exemplary glass materials are stable phosphate glasses which have a clearly low overall alkali content as known alkali-phosphate glasses.

Because of the generally high crystallization-stability of the phosphate glasses it is ensured that melting of the glasses is generally not hampered even at temperatures of <600° C. This allows for most of the listed glass compositions to be used as solder glass since melting of the glass compositions is generally not hampered even at temperatures of <600° C.

The glass material through which the conductor, in particular the pin-shaped conductor is guided includes, for example, at least the following components in mol-%:
$P_2O_5$ 35-50 mol-%, for example 39-48 mol-%;
$Al_2O_3$ 0-14 mol-%, for example 2-12 mol-%;
$B_2O_3$ 2-10 mol-%, for example 4-8 mol-%;
$Na_2O$ 0-30 mol-%, for example 0-20 mol-%;
$M_2O$ 0-20 mol-%, for example 12-19 mol-%, whereby M is K, Cs or Rb;
PbO 0-10 mol-%, for example 0-9 mol-%;
$Li_2O$ 0-45 mol-%, for example 0-40 mol-%, or 17-40 mol-%;
BaO 0-20 mol-%, for example 0-20 mol-%, or 5-20 mol-%; and
$Bi_2O_3$ 0-10 Mol-%, for Example 1-5 Mol-%, or 2-5 Mol-%.

A further exemplary composition includes the following components in mol-%:
$P_2O_5$ 38-50 mol-%, for example 39-48 mol-%;
$Al_2O_3$ 3-14 mol-%, for example 4-12 mol-%;

$B_2O_3$ 4-10 mol-%, for example 5-8 mol-%;
$Na_2O$ 10-30 mol-%, for example 14-20 mol-%;
$K_2O$ 10-20 mol-%, for example 12-19 mol-%; and
PbO 0-10 mol-%, for example 0-9 mol-%.

Surprisingly it has been shown that the inventive glass compositions with a lithium-share of up to 45 mol-%, for example 35 mol-% are crystallization-stable, meaning they do not display detrimental crystallization during a subsequent sintering process.

The previously mentioned glass compositions contain lithium which is integrated in the glass structure. The glass compositions are hereby especially suited for lithium-ion storage devices which include electrolytes based on lithium, for example a 1 Molar (M) $LiPF_6$-solution, having a 1:1 mixture of ethylene-carbonate and dimethyl-carbonate.

Low sodium or respectively sodium-free glass compositions are also feasible, since the diffusion of the alkali-ions occurs in Na+>K+>Cs+ sequence and since therefore low sodium glasses having less than 20 mol-% $Na_2O$ or respectively sodium-free glasses are especially resistant to electrolytes, especially those which are used in lithium-ion storage devices.

The resistance of the glass composition according to the present invention in regard to the battery electrolytes can be verified in that the glass composition in the form of a glass powder is ground to a granularity of d50=10 micrometers ($\mu$m) and is stored in the electrolytes for a predetermined time period, for example one week. d50 means, that 50% of all particles or granules of the glass powder are smaller than or equivalent to a diameter of 10 $\mu$m. A carbonate mixture of ethylene-carbonate and dimethyl-carbonate is used for example as a non-aqueous electrolyte at a ratio of 1:1 M $LiPF_6$ as conducting salt. After the glass powder was exposed to the electrolyte, the glass powder can be filtered off and the electrolyte be examined for glass elements which were leached from the glass. Herein it has been proven that with the phosphate glasses in the previously described composition ranges such leaching occurs surprisingly only to a limited extent of less than 20 mass percent; and that in special instances leaching of <5 mass percent is achieved. Moreover, such glass compositions have a thermal expansion $\alpha$ (20° C. to 300° C.)>$14 \cdot 10^{-6}$/K, for example between $15 \cdot 10^{-6}$/K and $25 \cdot 10^{-6}$/K. An additional advantage of the previously cited glass composition can be seen in that sealing of the glass with the surrounding light metal or respectively the metal of the conductor is possible also in a gaseous atmosphere which is not an inert gas atmosphere. In contrast to the previously used method, a vacuum is also no longer necessary for aluminum (Al)-sealing. This type of sealing can rather occur under atmospheric conditions. For both types of sealing nitrogen ($N_2$) or argon (Ar) can be used as inert gas.

As a pre-treatment for sealing, the metal, in particular the light metal, is cleaned and/or etched, and if necessary is subjected to targeted oxidizing or coating. During the process, temperatures of between 300° C. and 600° C. are used at heating rates of 0.1 to 30 Kelvin per minute (K/min) and dwell times of 1 to 60 minutes.

In order to make the glass composition accessible for infrared (IR)-heating, the aforementioned glasses can be provided with doping agents having an emission maximum in the range of infrared radiation, in particular IR-radiation of an IR-source. Examples of materials for this are Fe, Cr, Mn, Co, V, and other pigments. The thus prepared glass material can be heated by locally targeted infrared radiation. The advantage of the IR-heating is found in that it is possible to utilize glasses or glass ceramics which have a sealing temperature which is higher than the melting temperature of the material of the base body, in particular the disk-type metal part and/or the pin-shaped conductor which is inserted through the opening in the base body.

In order to provide a chemical resistance to, for example, electrolyte solutions of the batteries, the glass or glass ceramic material through which the pin-shaped conductor is guided may be covered by a third glass material which has an especially favorable hydrofluoric acid (HF)-resistance. A glass material of this type would, for example, be a phosphate glass. Instead of glass, a synthetic material which is HF resistant can also be used as a coating, that is as a cover material. The resistance of the cover glass is to protect essentially against acids, for example HF. Water ($H_2O$) resistance is also advantageous.

The coefficient of expansion of the cover glasses is largely coordinated with the coefficient of expansion of the glass or glass ceramic material of the glass plug, consisting of a first and/or second glass material.

The glass plug through which the pin-shaped conductor is inserted can be produced as a formed glass component, consisting of at least two glass materials having different coefficients of expansion, $\alpha_1$, $\alpha_2$ as the glass formation part.

According to a further embodiment of the present invention the feed-through is structured such that only a single glass material is used which, as a rule is adapted to the material of the pin-shaped conductor which can, for example, contain copper having a coefficient of expansion of $\alpha \approx 16 \times 10^{-6}$/K or aluminum having a coefficient of expansion of approximately $\alpha \approx 23 \times 10^{-6}$/K at 20° C.

Alternatively to a glass material which can be heated with the assistance of IR-radiation, the glass material may also be applied to the metal part with the assistance of ultrasonic welding in accordance with a further embodiment of the present invention. The glass or glass material may have the same coefficient of expansion $\alpha$ when heating with IR-radiation or ultrasonic welding as has the pin-shaped conductor, in particular the metal pin. When joining a metal part in the form of the base body with a metal pin by means of ultrasonic welding, and a glass material, various possibilities are conceivable. In a first embodiment, the glass is applied onto and joined with the metal part using ultrasound. The metal pin is welded on the metal part causing a thickening.

In order to achieve greater mechanical stability of the metal pin and to be able to exert greater pressure on the metal pin, the feed-through opening may be provided to be conical. Moreover, the metal pin may have a polygonal outer form, whereby a torque is exercised upon the metal pin, that is the metal pin or respectively the pin-shaped conductor is secured in the opening through twisting.

An additional possibility of achieving seal in a base body having a low melting point is to first seal the glass or glass ceramic material with the metal pin. Subsequently the base body consisting of the material having the low melting point, for example aluminum, is produced by die casting, whereby the metal pin with the glass or glass ceramic material is coated by spraying with the material having the low melting temperature, in particular the light metal, for example aluminum, resulting in the base body consisting of material having a low melting temperature, in particular aluminum; whereby the material having the low melting temperature shrinks onto the glass or glass ceramic material. Through cooling after spray coating which occurs, for example by die casting in a die-casting machine, pre-stress of the base body produced through die-casting is applied onto the glass or glass ceramic material with the pin-shaped conductor.

In a further embodiment of the present invention, a support device is provided in the region of the opening, in order to be able to better adapt the expansion to the glass or the respective glass type. The support device succeeds in adapting the expansion of the base body to the glass and the respective glass type and in applying compression to the glass. This allows the use of other glasses or glass types than when the glass or respectively the glass type is adapted only to the material of the base body. Thereby it becomes possibly to provide a hermetically sealed feed-through with only one glass type. The support device may be in the embodiment of a support ring or alternatively the metal part as a composite material.

The present invention provides a feed-through, in particular a feed-through for an electric storage device, such as a battery which, in contrast to feed-throughs known from the current state of the art, in particular those using synthetic material as sealing material, distinguishes itself through a high temperature resistance, in particular temperature change resistance. Moreover, a hermetic seal is also provided during temperature change, thus avoiding that battery liquid can emerge from and/or moisture can penetrate into the housing. It is understood that with a hermetic seal the helium leakage rate is $<1\times10^{-8}$ millibar liters per second (mbar l/s), for example $<1\times10^{-9}$ mbar l/s at a pressure differential of 1 bar. Because the present invention provides a hermetically sealed feed-through, the life span of an electric storage device, in particular a battery cell, is considerably extended. A hermetic seal is in particular also ensured if the pin-shaped conductor which is inserted through the glass or glass ceramic material heats up significantly temporarily due to high currents and/or during a short circuit.

In addition to the feed-through, the present invention also provides an electric storage device, in particular a battery, for example a battery cell which is provided with a feed-through according to the present invention. The housing consists, for example, of the same material as the base body, in particular of a light metal. With battery cells the base body is, for example, part of the battery housing. The battery is, for example a lithium-ion battery.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
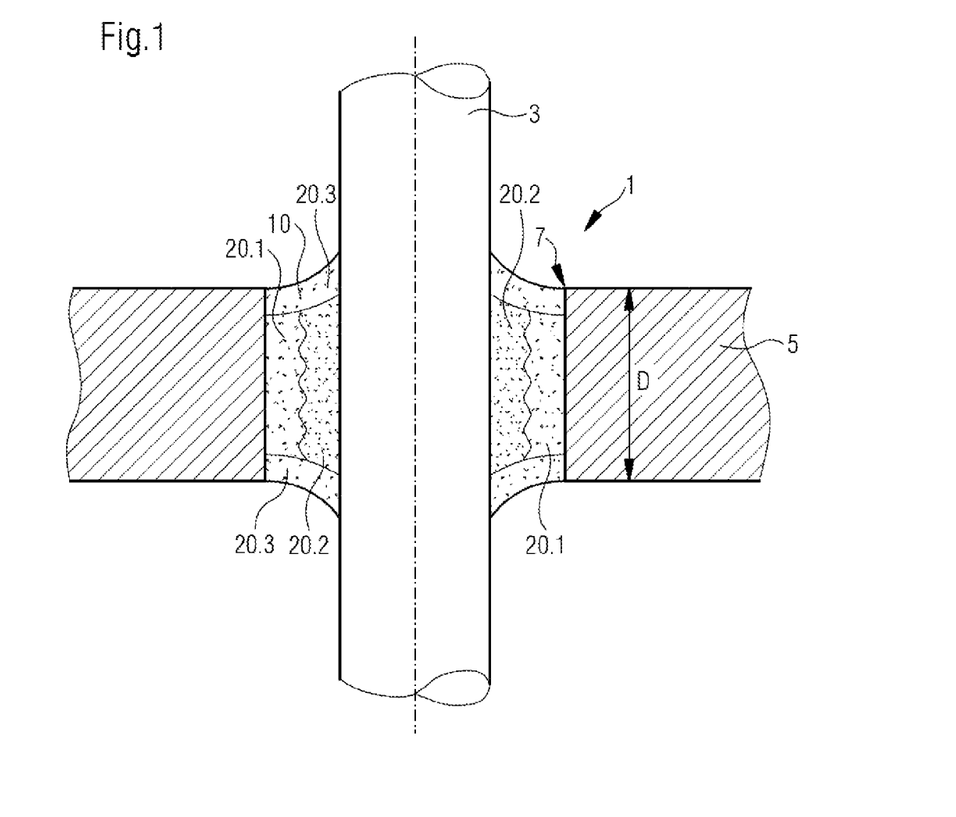
FIG. 1 is an inventive feed-through with one multi-component glass.

Referring now to the drawings, and more particular to FIG. 1, there is shown feed-through 1 according to the present invention. Feed-through 1 includes as pin-shaped conductor metal pin 3 which consists for example of a material containing copper, as well as base body 5 in the form of a metal part which, according to the present invention consists of a metal having a low melting temperature, specifically a light material, such as aluminum, an aluminum alloy, titanium, a titanium alloy, magnesium or a magnesium alloy. Light metals, as used in the current invention have a density of <5 kilograms per cubic decimeter ($kg/dm^3$), for example in the range of $1.0\ kg/dm^3$ to $3.0\ kg/dm^3$. If the light metals are used as material for the conductor, then the electric conductivity is in the range of $5\times10^6$ S/m to $50\times10^6$ S/m. The coefficient of expansion $\alpha$ (20° C.-300° C.) of the light metal is in the range of $18\times10^{-6}/K$ to $30\times10^{-6}/K$.

Metal pin 3 is guided through opening 7 which is arranged in base body 5. Even though only insertion of one single metal pin through the opening is illustrated, several metal pins may also be inserted through opening 7, without deviating from the present invention.

The outer contour of opening 7 can be round, but also oval. Opening 7 penetrates through the entire thickness D of base body 5, or respectively metal part 5. Metal pin 1 is sealed into glass or glass ceramic material 10 and is guided inside the glass or glass-ceramic material 10 through opening 7 through base body 5. Opening 7 is introduced into base body 5 through a process such as stamping. In order to provide a hermetic feed-through of metal pin 3 through opening 7, metal pin 3 is sealed into a glass plug consisting of glass or glass ceramic material 10. A substantial advantage of this production method consists in that even under increased pressure upon the glass plug, for example a compression load, expulsion of the glass plug with metal pin from opening 7 is avoided. It is, for example, provided that the sealing temperature of the inventive glass or glass ceramic material 10 with base body 5 is 20K to 100K below the melting temperature of the material of base body 5 and/or of pin shaped conductor 3.

Without restriction thereto, glass plug 10 shown in the illustrated embodiment does not consist of a single material, but rather of several materials, in other words, a multi-component glass. Since the coefficient of expansion $\alpha_{Cu}$ of metal pin 3 which consists, for example, of copper is for example in the range of $16\times10^{-6}/K$ at 20° C. and the coefficient of expansion $\alpha_{Al}$ of the base body or respectively the metal part which is produced, for example from aluminum, is in the range of $23\times10^{-6}/K$, the glass plug—on the side of glass material 10 facing base body 5 or respectively the metal part—features a first glass material 20.1 whose coefficient of expansion $\alpha_1$ is in the range of the coefficient of expansion of base body 5. In the event that the metal part is produced from aluminum, the coefficient of expansion $\alpha_1$ is in the range of 16 to $25\times10^{-6}/K$ Even though in the current example the glass plug consists of several materials, namely one first and one second glass material having different coefficients of expansion $\alpha_1$, $\alpha_2$, this is not obligatory. One single material is also conceivable, whereby the sealing temperature is, for example below the melting temperature of the surrounding metal.

The second glass material 20.2 of the multi-component glass facing toward the metal pin essentially has the coefficient of expansion $\alpha_2$ of metal pin 3. If metal pin 3 is a copper pin, then coefficient of expansion $\alpha_2$ of second glass material 20.2 is between 12 and $18 \times 10^{-6}$/K.

In order to increase the chemical resistance of the multi-component glass 10 to, for example, hydrofluoric acid (HF) and/or water it is provided that a cover glass 20.3 or a plastic layer is applied to the glass layers of first and second glass material 20.1, 20.2.

The first glass materials for outer glass 20.1 can be silicate-titanate, sulfa-phosphate, telluride, borate, vanadate, fluoride, phosphate and silicate, whereby the glasses may contain fillers or alkalis or alkaline earths for adjustment of expansion. For the inside glass, that is second glass material 20.2 facing metal pin 3 silicate-titanate, sulfa-phosphate, telluride, borate, vanadate, fluoride, phosphate and silicate are also considered, whereby also in this case fillers such as alkalis or alkaline earths for adaptation of the expansion could be provided. The cover glasses are, for example, third glass materials or synthetic materials which have sufficient chemical resistance, for example against hydrofluoric acid (HF). In the case of lithium-ion batteries, cover glasses are, for example, phosphate glasses. In addition to the sealing temperatures which must be lower than the melting temperatures of base body 5 having a low melting point, the glasses must be selected so that they possess the necessary resistance against acids, in particular HF and/or water.

Figure 2:
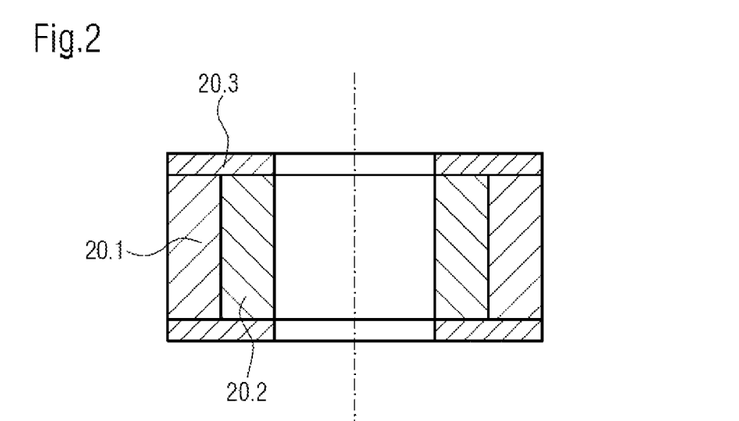
FIG. 2 is a multi-component glass in the form of a glass blank which may be utilized in association with the inventive feed-through of FIG. 1.

FIG. 2 is also a detailed illustration of a glass plug, as can be used in FIG. 1. The glass plug is produced as a triple glass or multi-component glass blank and includes a total of three glasses, the first glass material 20.1, for example having a coefficient of expansion $\alpha_1$ in the range $(16 \text{ to } 25) \times 10^{-6}$/K, the second glass material 20.2, for example having a coefficient of expansion $\alpha_2$ in the range $(12 \text{ to } 18) \times 10^{-6}$/K, as well as the third glass material 20.3 as cover glass with sufficient resistance, for example in regard to hydrofluoric acid and/or water.

Figure 3:
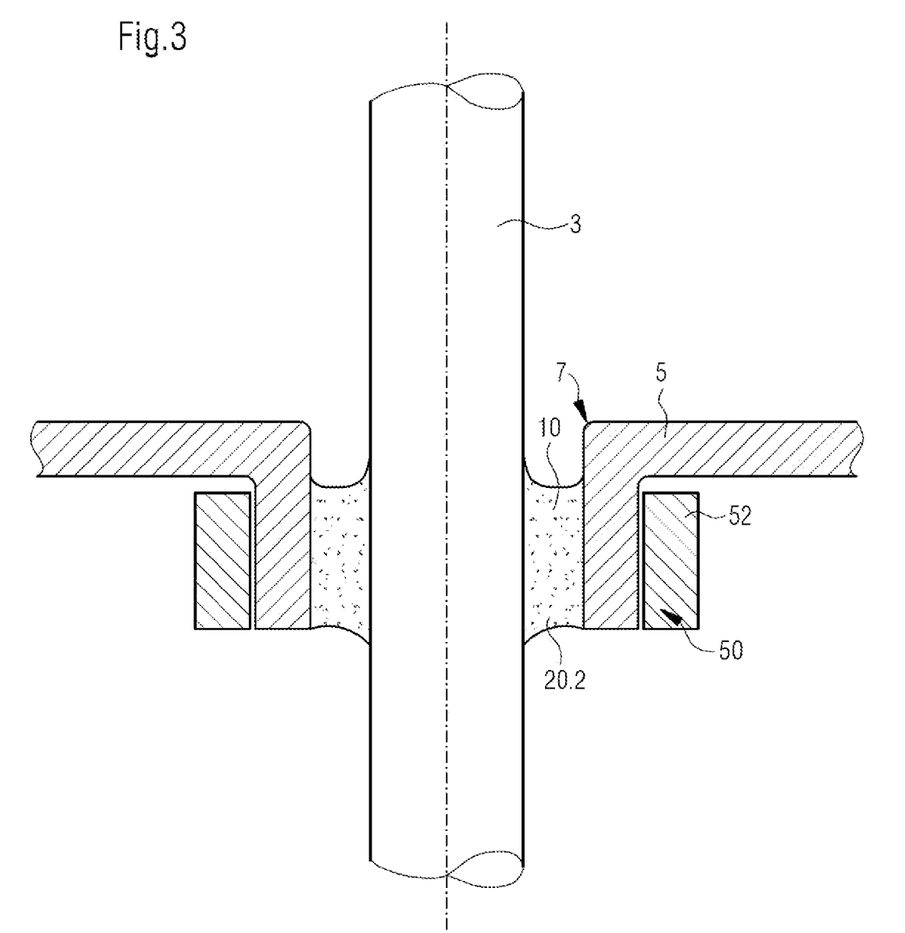
FIG. 3 is a feed-through with a support ring.
Figure 4:
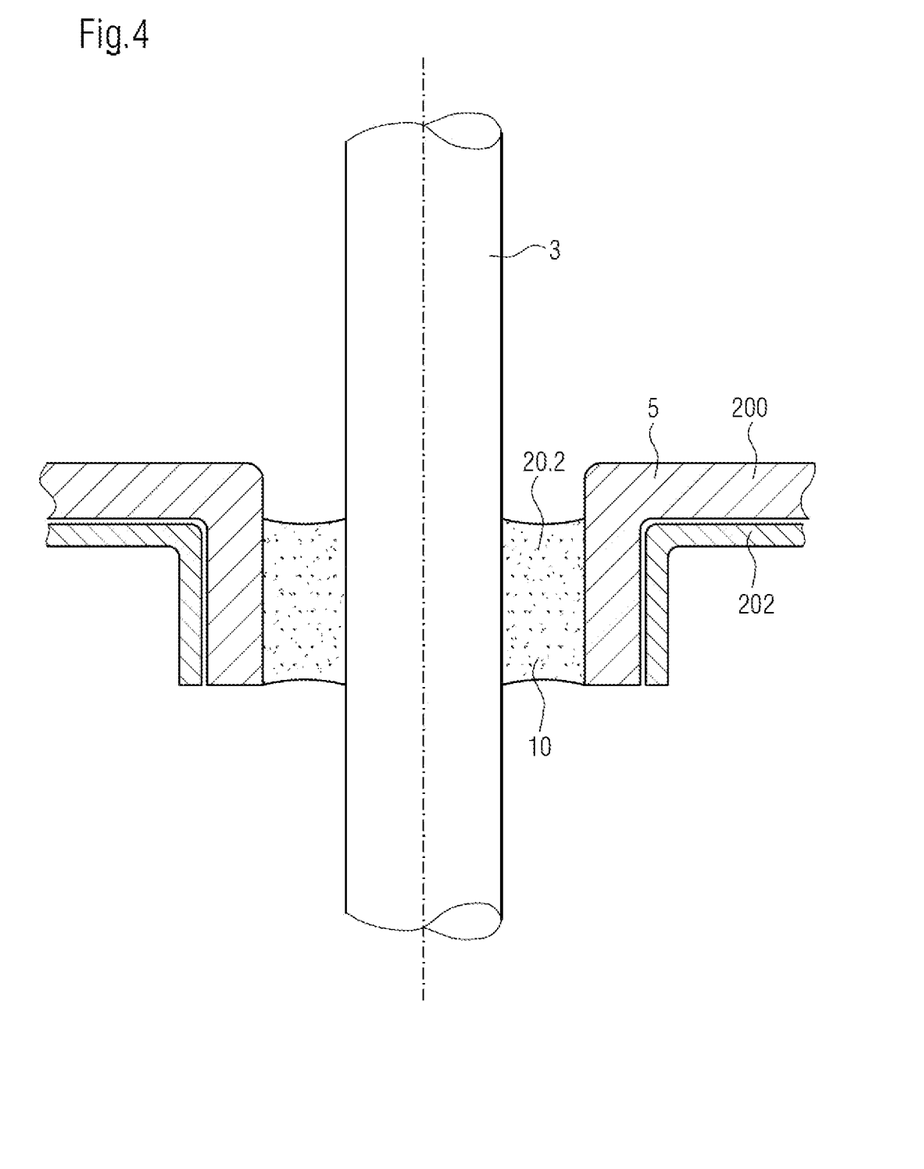
FIG. 4 is a feed-through with a support ring; a feed-through with a composite material for the metal part as support ring.

As an alternative to a design with one multi-component glass, use of just one single glass is also possible, as illustrated in FIGS. 3 and 4. If the glass plug consists of one single glass material, for example one single glass composition, it would generally be stable phosphate glass which has a clearly low overall alkaline content as known alkali-phosphate glass. Because of the generally high crystallization-stability of the phosphate glasses it is ensured that the melting of the glasses is generally not hampered even at temperatures of <600° C. This allows for most of the listed glass compositions to be used as solder glass since melting of the glass compositions is generally not hampered even at temperatures of <600° C.

The sealing temperature may, for example, be determined through the hemispherical temperature as described in R. Görke, K. J. Leers: Keram. Z. 48 (1996) 300-305, or according to DIN 51730, ISO 540 or CEN/TS 15404 and 15370-1 whose disclosure content is incorporated in its entirety in the current patent application. The measurement of the hemispherical temperature is described in detail in DE 10 2009 011 182 A1 whose disclosure content is incorporated in its entirety into the current patent application. According to DE 10 2009 011 182A1, the hemispherical temperature can be determined in a microscopic process by using a heating stage microscope. It identifies the temperature at which an originally cylindrical test body melted into a hemispherical mass. A viscosity of approximately log $\eta$=4.6 deciPascals (dPas) can be allocated to the hemispherical temperature, as can be learned from appropriate technical literature.

The glass material through which the pin-shaped conductor is guided includes, for example, at least the following components in mol-%:

$P_2O_5$ 35-50 mol-%, for example 39-48 mol-%;
$Al_2O_3$ 0-14 mol-%, for example 2-12 mol-%;
$B_2O_3$ 2-10 mol-%, for example 5-8 mol-%;
$Na_2O$ 0-30 mol-%, for example 0-20 mol-%;
$M_2O$ 0-20 mol-%, for example 12-19 mol-%, whereby M is K, Cs or Rb;
PbO 0-10 mol-%, for example 0-9 mol-%;
$Li_2O$ 0-45 mol-%, for example 0-40 mol-%, or 17-40 mol-%;
BaO 0-20 mol-%, for example 0-20 mol-%, or 5-20 mol-%; and
$Bi_2O_3$ 0-10 mol-%, for example 1-5 mol-%, or 2-5 mol-%.

The following table 1 shows exemplary of glasses of this type:

TABLE 1

| Mol-% | AB1 | AB2 | AB3 | AB4 | AB5 | AB6 | AB7 | AB8 |
|---|---|---|---|---|---|---|---|---|
| $P_2O_5$ | 47.6 | 43.3 | 43.3 | 43.3 | 37.1 | 40.0 | 42.0 | 46.5 |
| $Al_2O_3$ | 4.2 | 8.6 | 8.7 | 2.0 | 2 | 12.0 | 12.0 | 4.2 |
| $B_2O_3$ | 7.6 | 4.8 | 4.7 | 4.8 | 4.9 | 6.0 | 6.0 | 7.6 |
| $Na_2O$ | 28.3 | 17.3 | | | | 15.0 | 16.0 | 28.3 |
| $K_2O$ | 12.4 | 17.3 | 17.3 | | | 18.0 | 19.0 | 12.4 |
| PbO | | | | | | 9.0 | | |
| BaO | | 8.7 | 8.7 | 15.4 | 14 | | | |
| $Li_2O$ | | | 17.3 | 34.6 | 42.1 | | | |
| $Bi_2O_3$ | | | | | | | 5 | 1 |
| Hemisphere Temp. (° C.) | 513 | 554 | 564 | 540 | 625 | | 553 | 502 |
| $\alpha$ 20-300° C. ($10^{-6}$/K) | 19 | 16.5 | 14.9 | 13.7 | 14.8 | 16.7 | 16.0 | 19.8 |
| Tg (° C.) | 325 | 375 | 354 | 369 | 359 | 392 | 425 | 347 |
| Density [g/cm$^3$] grams per cubic centimeter | 2.56 | | | | | | 3 | 3 |
| Leaching In Ma-% | 18.7 | 14.11 | 7.66 | 12.63 | 1.47 | 3.7 | 29.01 | 8.43 |
| Weight loss (%) after 70 h in 70° C.-Water | 10.7 | 0.37 | 0.1 | 0.13 | 0.13 | n.b. | 0.006/0.001 | 0.45/0.66 |

Example 1 in Table 1 is suitable for aluminum/aluminum sealing, that is sealing of an aluminum pin as the conductor into a surrounding aluminum base body.

Example 6 in Table 1 is suitable for Cu/Al sealing, that is sealing of a copper pin as the conductor into a surrounding aluminum base body.

In addition to leaching as a measure for resistance against non-aqueous electrolytes, the hydrolytic resistances of the individual glasses were also determined. The hydrolytic resistance tests were conducted so that melted down glass samples were produced (2×2 centimeters (cm), height: ~0.5 cm) which were stored in 200 milliliters (mL) water at 25° C. and 70° C. for 70 hours. Subsequently the material loss in weight % was determined and listed in the table.

Even though some of the examples have coefficients of expansion which tend to be too low for bonding with Cu, it is clear that a high lithium-share in the molten mass can be dissolved without the glass of such a glass composition becoming instable.

Examples AB7 and AB8 distinguish themselves in that they contain Bi2O3 instead of PbO, as in example 6. Surprisingly it has been shown that the water resistance can be clearly increased by $Bi_2O_3$. For example, by introducing 1 mol-% $Bi_2O_3$, a 10-times higher water resistance is achieved in example AB1. $Bi_2O_3$ can also be used in place of PbO according to example 6. Glass compositions which, except for contaminants are, free of PbO, meaning that they include less than 100 parts per million (ppm), for example less than 10 ppm, or less than 1 ppm of PbO may be effectively utilized according to the present invention.

Table 1 shows the composition in mol-%, the transformation temperature Tg as defined for example in "Schott Guide to Glass, second edition, 1996, Chapman & Hall, pages 18-21, the total leaching in mass percentage (Ma-%), the coefficient of expansion α in $10^{-6}$/K in the range of 20° C.-300° C., as well as the density in g/cm$^3$.

The total leaching is determined as described below. First, the glass composition is ground to glass powder having a d50=10 micrometers (μm) granularity, and is exposed for one week to the electrolyte consisting of ethylene-carbonate/dimethyl-carbonate at a ratio 1:1, with 1 Molar $LiPF_6$ in the form of conducting salt dissolved therein and after this time is examined for glass components which were leached from the glass. "n.b." in Table 1 denotes unknown properties.

Support devices are advantageously provided for the metal part, for example for absorption of different expansions. Components in FIG. 3 which are identical to those in FIGS. 1 and 2 are identified with the same reference numbers. Metal pin 3 is again embedded in seal 10 which, in the current example consists of a single material 20.2, whereby the glass material is adapted in its coefficient of expansion α to metal pin 3 and which has a sealing temperature which is 20 K to 100 K below the melting temperature of the metal. The coefficient of expansion $α_2$ of glass material 20.2 is for example between (12 and 18)×$10^{-6}$/K, if the metal pin is made of copper, since the coefficient of expansion $α_{Cu}$ of copper is approximately 16×$10^{-6}$/K at 20° C.

Base body 5 or respectively the metal part again has an opening 7. Base body 5 consists, for example, of a light metal, such as aluminum and in the case of aluminum has a coefficient of expansion of $α_{Al}$ of approximately 23×$10^{-6}$/K at 20° C.

In order to adapt the pre-stress to the glass and the respective glass type and to apply a compression onto glass 10, a support device 50, in this case a support ring 52 which may consist of stainless steel, is provided. For this purpose base body 5 is reshaped and is positioned between support ring 52 and glass material 20.2.

Alternatively to an embodiment with support ring 52 as the supporting device according to FIG. 3, a composite material can be provided for metal part 5. The composite material would be an aluminum-metal composite. Referring now to FIG. 4, a steel 202 would be platinized onto aluminum component 200. As in the embodiment according to FIG. 3, glass material 10 is a single component glass 20.2 as previously described with appropriate Tg whose coefficient of expansion α is adapted to metal pin 3. If metal pin 3 is made of a copper material, then the coefficient of expansion α of glass material 20.2 ranges between (12 to 18)×$10^{-6}$/K.

Figure 5:
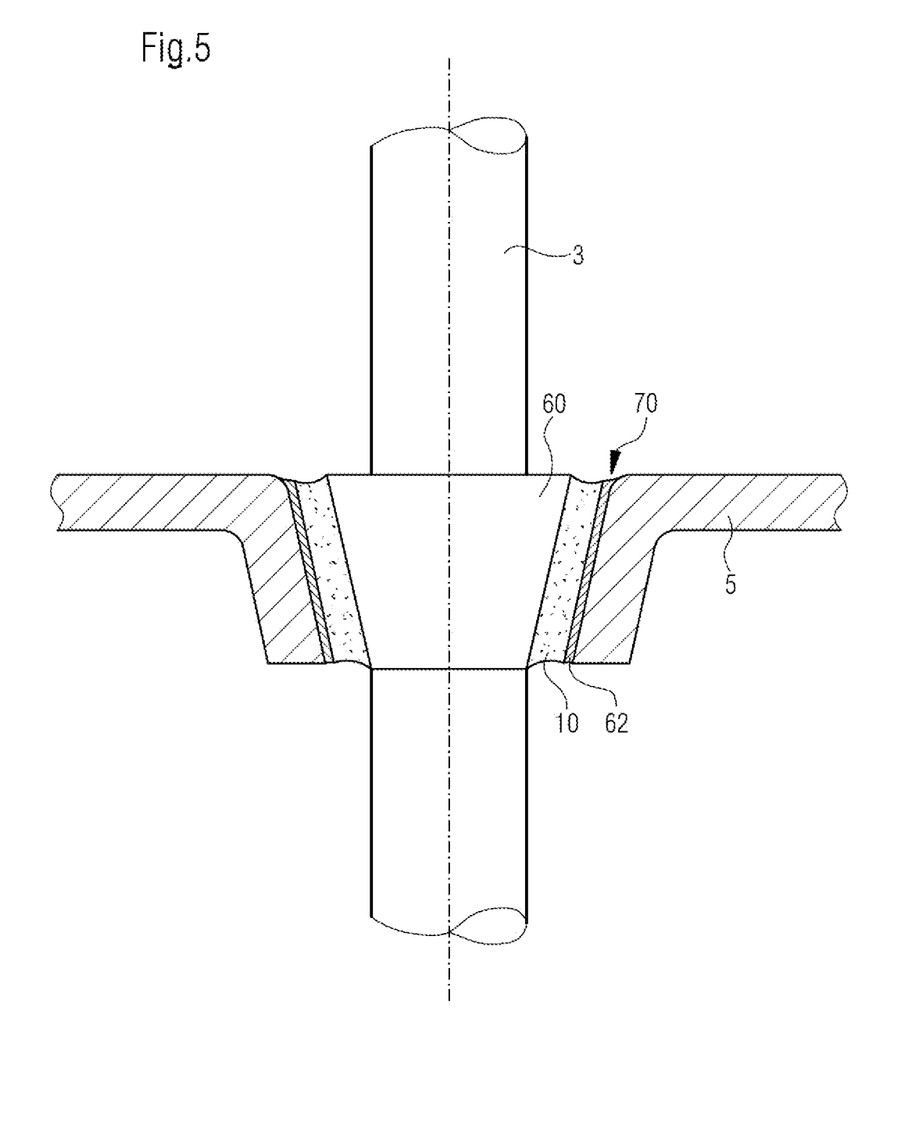
FIG. 5 is a feed-through according to the present invention with an ultrasonically welded connection of the glass material in the feed-through opening.
Figure 6:
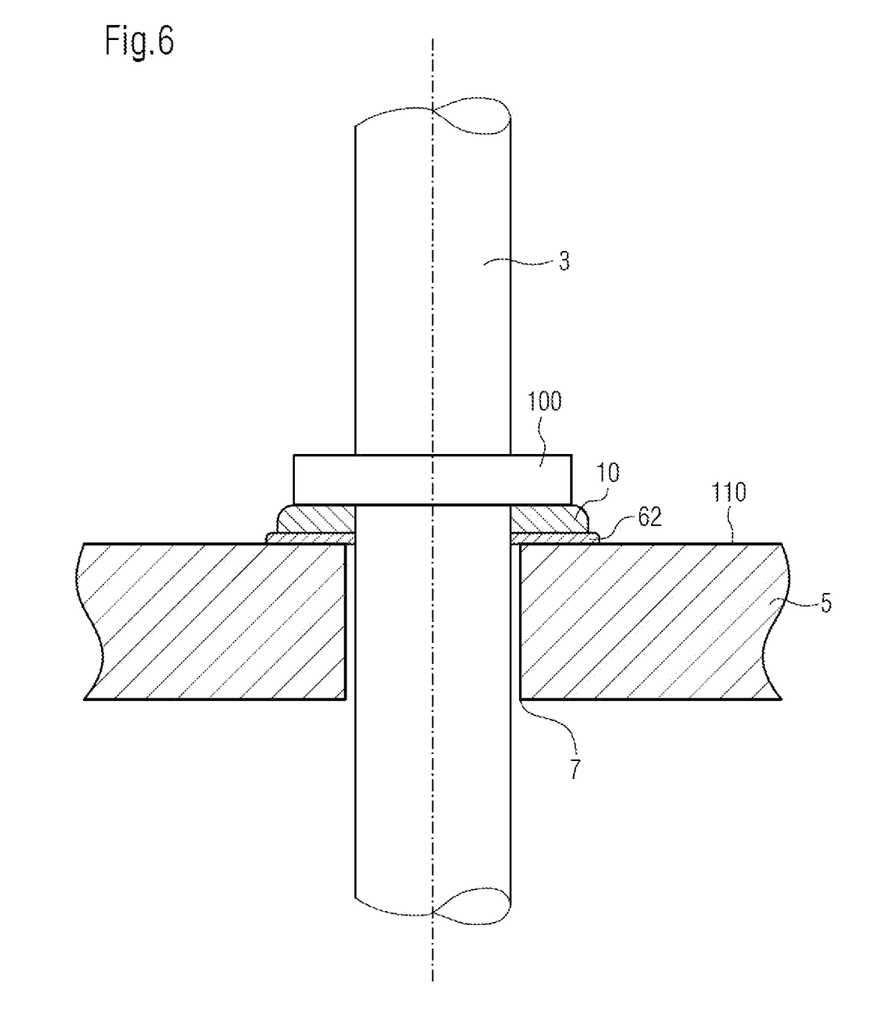
FIG. 6 is a feed-through according to the present invention with an ultrasonically welded glass material on a metal piece.

As an additional embodiment of the present invention, a feed-through is shown in FIGS. 5 and 6, which is produced by bonding the glass material using ultrasonic welding with metal component or base body 5. Ultrasonic welding of glass plug 10 into the conically tapering feed-through opening 70 has the advantage that due to conically tapering opening 70 a pressure can be built up on metal pin 3, thus achieving a greater mechanical stability of metal pin 3. Moreover, a torque can be applied on the metal pin through a polygonal form in region 60 of the metal pin. The ultrasonic welding between glass plug 10 and metal component 5 is identified with 62. The coefficient of expansion of glass material 10 is adapted to that of the metal pin and in the event that metal pin 3 is manufactured of copper, is in the range of $α_2≈(12$ to $18)×10^{-6}$/K.

FIG. 6 illustrates an alternative embodiment of a feed-through produced using ultrasonic welding. In the feed-through illustrated in FIG. 6, metal pin 3 is provided with an annulus 100. Metal pin 3 is inserted through opening 7 of metal component or base body 5. Annulus 100 has a larger diameter than the diameter of opening 7. Annulus 100 which is firmly connected with metal pin 3 can therefore be attached to topside 110 of metal component 5 using ultrasonic welding. The ultrasonic welding, that is the connecting region of base body or respectively metal component 5 with glass 10 is again identified with reference number 62. Glass material 10 is introduced between annulus 100 and connecting region 62. Glass material 10 has a coefficient of expansion $α_2$ which largely corresponds with that of the metal pin, that is between $α_2≈(12$ to $18)×10^{-6}$/K.

Figure 7:
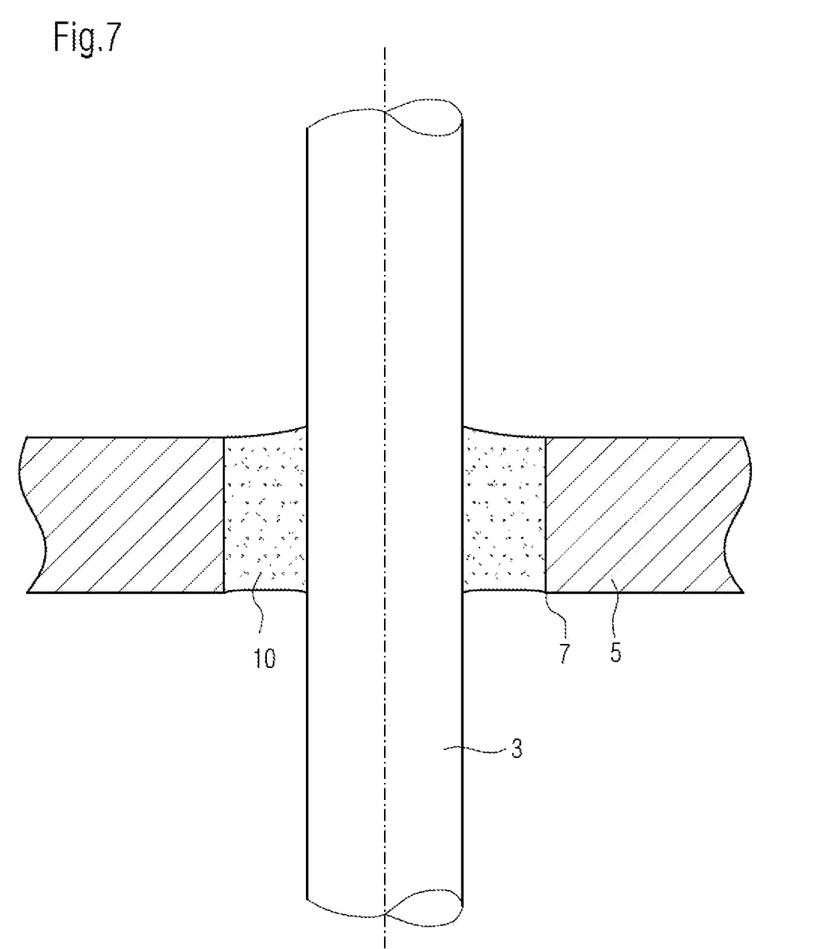
FIG. 7 is a feed-through according to the present invention with a material which absorbs IR-radiation.

An additional embodiment of the present invention is illustrated in FIG. 7. In FIG. 7, the metal pin is again identified with 3, the base body with 5 and the opening with 7.

A glass material 10 is again introduced in the opening between metal pin 3 and base body 5, in particular the metal component. Glass material 10 is a glass material which is essentially adapted to the coefficient of expansion α of metal pin 3. If metal pin 3 is made of a copper material, then the coefficient of expansion of the metal pin is approximately 16×$10^{-6}$/K. Glass material 10 accordingly has a coefficient of expansion $α_2$ of between (12 to 18)×$10^{-6}$/K.

In the embodiment according to FIG. 7, doping agents which have an emission maximum in the range of infrared radiation are added to glass material 10. These doping agents are for example iron, chromium, cobalt, vanadium.

Due to the doping agents the glass is for example strongly heated by IR-radiation radiated from an infrared radiator. Since this heating or warming is based solely on the absorption of IR-radiation in the glass, a possibility is herewith provided to raise the temperature of the glass to above the melting temperature of the metal part or the metal pin. This is advantageous in particular when using light metals for the base body.

The current invention cites for the first time a feed-through whereby a metal pin is guided through a light metal and is hermetically sealed. This is achieved on the one hand by using glasses which have a sealing temperature which is lower than the melting point of the light metal, whereby the glasses are, for example, always adapted to the coefficient of expansion of the metal pin. Alternative methods for sealing are ultrasonic welding or infrared heating, whereby the glass materials are doped with infrared radiation-absorbing substances.

With the feed-through according to the present invention, a battery housing can be provided which is hermetically sealed even in the event of a deformation of the battery housing, in contrast to plastic feed-throughs which have a tendency to crack. On batteries with battery housings which are equipped with an inventive feed-through an especially high fire resistance is hereby provided in the event of a vehicle accident. This is particularly relevant in the use of batteries, for example lithium-ion batteries in the automobile industry.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feed-through, comprising:
   a base body having at least one opening and formed from a material having a low melting point;
   a material which is one of a glass material and a glass ceramic material selected so that a sealing temperature of said glass or glass ceramic material is below a melting temperature of said base body, said material which is one of a glass material and a glass ceramic material being covered by one of a cover glass and a synthetic material; and
   a conductor embedded in said material which is one of a glass material and a glass ceramic material and guided through said at least one opening in said base body.

2. The feed-through according to claim 1, wherein said base body is a disk-like metal part.

3. The feed-through according to claim 2, wherein said conductor is an essentially pin-shaped conductor.

4. The feed-through according to claim 3, wherein said conductor includes an additional material, said additional material of said conductor being different from said material of said base body.

5. The feed-through according to claim 4, wherein said additional material of said conductor is a metal.

6. The feed-through according to claim 5, wherein said metal is one of copper, copper silicon carbide (CuSiC), a copper alloy, aluminum silicon carbide (AlSiC), silver, a silver alloy, gold and a gold alloy.

7. The feed-through according to claim 3, wherein said base body is formed by die-casting, said material which is one of a glass material and a glass ceramic material is sealed with said pin-shaped conductor, and said pin-shaped conductor is subsequently spray coated with a material having a low melting temperature.

8. The feed-through according to claim 7, wherein said material is sealed with said pin-shaped conductor and spray coated in a die cast machine.

9. The feed-through according to claim 3, wherein said conductor is formed from a metal having a low melting point.

10. The feed-through according to claim 9, wherein said metal of said conductor is a light metal.

11. The feed-through according to claim 10, wherein said light metal has a specific weight<5.0 kilograms per cubic decimeter (kg/dm$^3$).

12. The feed-through according to claim 11, wherein said light metal has a specific weight in a range of between approximately 1.0 kg/dm$^3$ and 3.0 kg/dm$^3$.

13. The feed-through according to claim 10, said light metal having a melting point in a range of between approximately 350° C. and 800° C.

14. The feed-through according to claim 13, said light metal having a melting point in a range of between approximately 350° C. and 700° C.

15. The feed-through according to claim 10, wherein said light metal has an electric conductivity in a range of between approximately $5\times10^6$ Siemens per meter (S/m) to $50\times10^6$ S/m.

16. The feed-through according to claim 15, wherein said light metal has an electric conductivity in a range of between approximately $10\times10^6$ S/m to $40\times10^6$ S/m.

17. The feed-through according to claim 10, wherein said light metal has a coefficient of expansion $\alpha$ at a temperature in a range of between 20° C. and 300° C. in a range of between $18\times10^{-6}$ per degree Kelvin (K) and $30\times10^{-6}$/K.

18. The feed-through according to claim 10, wherein said light metal is one of aluminum, magnesium, an aluminum alloy, a magnesium alloy, titanium and a titanium alloy.

19. The feed-through according to claim 1, wherein said base body is formed from a light metal.

20. The feed-through according to claim 1, wherein said material which is one of a glass material and a glass ceramic material is a glass material having a single glass composition.

21. The feed-through according to claim 20, wherein said single glass composition is a phosphate glass.

22. The feed-through according to claim 21, wherein said single glass composition includes in (mol-%):
   $P_2O_5$ 35-50 mol-%;
   $Al_2O_3$ 0-14 mol-%;
   $B_2O_3$ 2-10 mol-%;
   $Na_2O$ 0-30 mol-%;
   $M_2O$ 0-20 mol-%, wherein M is one of K, Cs and Rb;
   PbO 0-10 mol-%;
   $Li_2O$ 0-45 mol-%;
   BaO 0-20 mol-%; and
   $Bi_2O_3$ 0-10 mol-%.

23. The feed-through according to claim 1, wherein said material which is one of a glass material and a glass ceramic material is heated with the assistance of infrared radiation.

24. The feed-through according to claim 23, wherein said material which is one of a glass material and a glass ceramic material is heat with infrared radiation only.

25. The feed-through according to claim 1, wherein said material which is one of a glass material and a glass ceramic material is welded ultrasonically.

26. The feed-through according to claim 1, further comprising a plurality of support devices in a region of said at least one opening.

27. The feed-through according to claim 26, wherein said support devices include a support ring.

28. The feed-through according to claim 27, wherein said support devices include a metal component formed of one of aluminum, aluminum silicon carbide (AlSiC) and roll-bonded steel.

29. A feed-through, comprising:
a base body having at least one opening and formed from a material having a low melting point;
a material which is one of a glass material and a glass ceramic material selected so that a sealing temperature of said glass or glass ceramic material is below a melting temperature of said base body, said material which is one of a glass material and a glass ceramic material being at least two materials including a first material and a second material, each of said first material and said second material being one of a glass material and a glass ceramic material, said first material and said second material each having a different coefficient of expansion α at a temperature in a range between approximately 20° C. and 300° C., said first material being selected so that a coefficient of expansion α1 of said first material is adapted to a coefficient of expansion of said material of said base body; and
an essentially pin-shaped conductor embedded in said material which is one of a glass material and a glass ceramic material and guided through said at least one opening in said base body, said second material being selected so a coefficient of expansion α2 of said second material is adapted to a coefficient of expansion of a material of said essentially pin-shaped conductor.

30. The feed-through according to claim 29, wherein said coefficient of expansion $\alpha_1$ of said first material is in a range of between approximately $16 \times 10^{-6}$ per degree Kelvin (K) and $25 \times 10^{-6}$/K in a temperature range of between approximately 20° C. and 300° C.

31. The feed-through according to claim 30, wherein said first material is a glass material, selected from at least one of silicate-titanate, sulfa-phosphate, telluride, borate, vanadate, fluoride, phosphate, silicate.

32. The feed-through according to claim 31, further comprising fillers for adaptation to expansion, doping agents in a range of an emission maximum of infrared radiation, and one of alkalis and alkaline earths.

33. The feed-through according to claim 32, wherein said doping agents include iron (Fe), Chromium (Cr), Cobalt (Co) and Vanadium (V).

34. The feed-through according to claim 33, wherein said second material which is one of a glass material and a glass ceramic material has a coefficient of expansion $\alpha_2$ in a range of between $12 \times 10^{-6}$/K to $18 \times 10^{-6}$/K in a range of between 20° C. and 300° C.

35. The feed-through according to claim 34, wherein said material which is one of a glass material and a glass ceramic material further comprises a third material which is one of a glass material and a ceramic material having a high chemical resistance, said third material covering at least one of said first material and said second material.

36. The feed-through according to claim 35, wherein said third material is a phosphate glass.

37. The feed-through according to claim 29, wherein said material which is one of a glass material and a glass ceramic material is a multi-component glass.

38. The feed-through according to claim 37, wherein said multi-component glass is a glass blank consisting of at least said first material and said second material, each of said first and said second material being one of a glass material and a glass ceramic material.

39. The feed-through according to claim 38, wherein said material which is one of a glass material and a glass ceramic material includes doping agents having an emission maximum in a range of infrared radiation.

40. The feed-through according to claim 39, wherein said doping agents include iron (Fe), Chromium (Cr), Cobalt (Co), and Vanadium (V).

41. The feed-through according to claim 29, wherein said base body is a disk-like metal part for an electric storage device.

42. The feed-through according to claim 41, wherein said electric storage device is a battery.

43. The feed-through according to claim 41, wherein said metal part is one of round and angular.

44. A storage device, comprising:
a feed through including:
a base body having at least one opening and a low melting point;
a material which is one of a glass material and a glass ceramic material selected so that a sealing temperature of said material is below a melting temperature of said base body, said material which is one of a glass material and a glass ceramic material being covered by one of a cover glass and a synthetic material; and
a conductor embedded in said material and guided through said at least one opening in said base body.

45. The storage device according to claim 44, wherein the storage device is for a battery.

46. The storage device according to claim 45, wherein said battery is a lithium-ion battery.

47. The storage device according to claim 46, wherein said lithium-ion battery is a lithium-ion accumulator.

48. The storage device according to claim 45, said battery including a non-aqueous electrolyte.

49. The storage device according to claim 48, wherein said non-aqueous electrolyte is a carbonate.

50. The storage device according to claim 49, wherein said carbonate is a carbonate mixture.

51. The storage device according to claim 50, wherein said carbonate mixture includes ethylene-carbonate and dimethyl-carbonate with a conducting salt.

52. The storage device according to claim 51, wherein said conducting salt is $LiPF_6$.

53. A feed-through, comprising:
a base body having at least one opening and formed from a material having a low melting point;
a glass material having a single glass composition selected so that a sealing temperature of said glass material is below a melting temperature of said base body, said single glass composition including in mol-%:
$P_2O_5$ 39-48 mol-%;
$Al_2O_3$ 2-12 mol-%;
$B_2O_3$ 4-8 mol-%;
$Na_2O$ 0-20 mol-%;
$M_2O$ 12-19 mol-%, wherein M is one of K, Cs, and Rb;
PbO 0-9 mol-%;
$Li_2O$ 0-40 mol-%;
BaO 0-20 mol-%; and
$Bi_2O_3$ 1-5 mol-%; and
a conductor embedded in said glass material and guided through said at least one opening in said base body.

54. The feed-through according to claim 53, wherein said single glass composition includes (in mol-%):
$Li_2O$ 17-40 mol-%;
BaO 5-20 mol-%; and
$Bi_2O_3$ 2-5 mol-%.

* * * * *